J. MARCZI.
ANTISKID ATTACHMENT FOR TIRES.
APPLICATION FILED FEB. 19, 1914.
1,130,310. Patented Mar. 2, 1915.
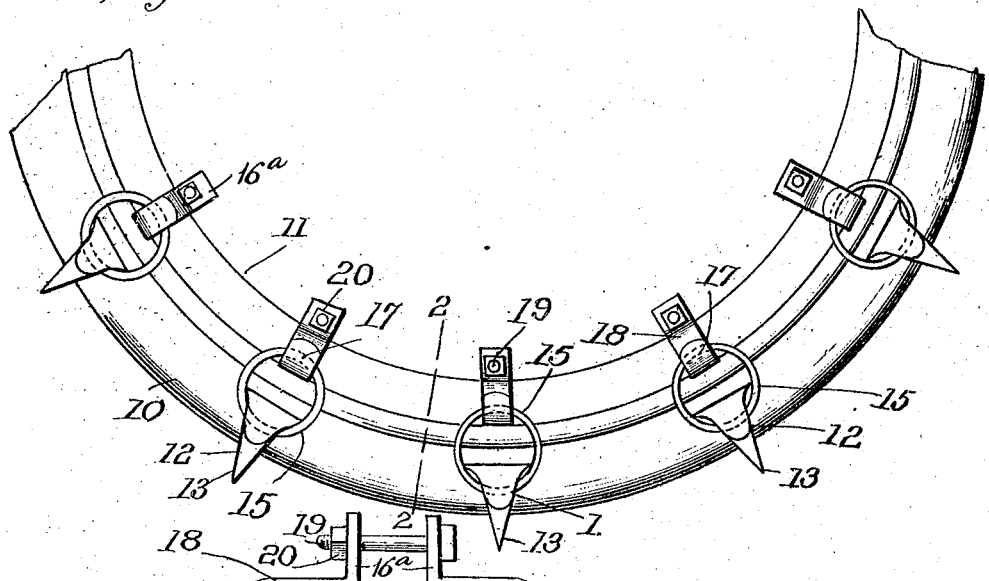
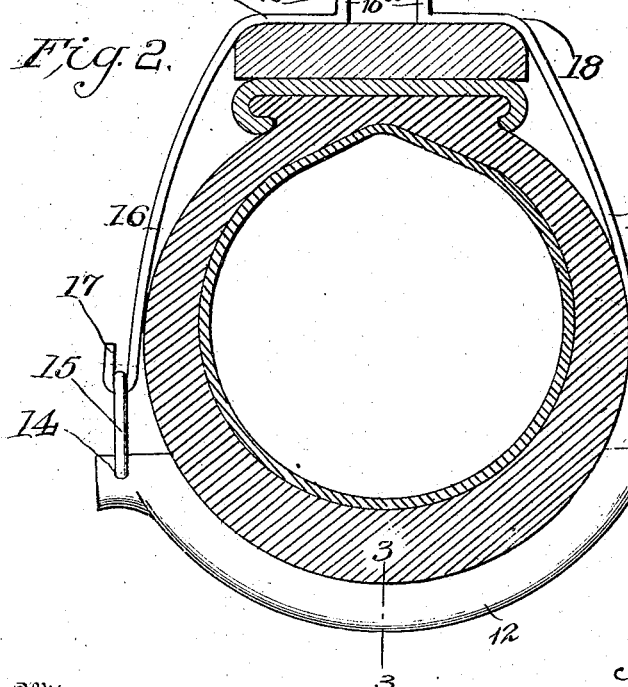
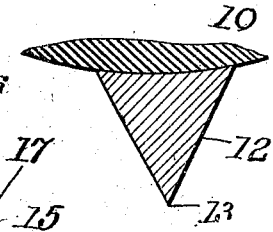
Inventor
John Marczi

UNITED STATES PATENT OFFICE.

JOHN MARCZI, OF LA BELLE, PENNSYLVANIA.

ANTISKID ATTACHMENT FOR TIRES.

1,130,310.   Specification of Letters Patent.   Patented Mar. 2, 1915.

Application filed February 19, 1914. Serial No. 819,679.

*To all whom it may concern:*

Be it known that I, JOHN MARCZI, a subject of the King of Hungary, residing at La Belle, in the county of Fayette and State of Pennsylvania, have invented certain new and useful Improvements in Antiskid Attachments for Tires, of which the following is a specification.

This invention relates to certain new and useful improvements in anti-skid attachments for tires.

An object of the invention is to provide an anti-skid attachment for automobile tires that may be easily and quickly mounted on the wheel and detached therefrom, should the same become broken or otherwise injured.

A further object of the invention is to provide means to prevent automobile wheels from skidding, consisting of independent anti-skid units that are separately attached to a wheel so that any one of the units may be removed from the wheel and a new unit attached when required.

With the above and other objects in view that will appear as the nature of the invention is better understood, the same consists in the novel construction, combination and arrangement of parts to be hereinafter more fully described and then claimed, reference being had to the accompanying drawing by like characters denoting corresponding parts throughout the several views, and in which:—

Figure 1 is a side elevational view of a portion of a wheel showing the anti-skid attachments secured thereto. Fig. 2 is a cross sectional view taken on the line 2—2 of Fig. 1, illustrating the manner of securing the anti-skid shoes to the tire, and Fig. 3 is a view taken on line 3—3 of Fig. 2.

Referring more specifically to the drawing accompanying this application and in which is shown a preferred embodiment of my invention, the reference numeral 10 designates a pneumatic tire of the usual construction mounted upon the rim 11. Means are provided to prevent the tire 10 from skidding or slipping over wet streets or uneven roads and consists of a shoe 12 that is preferably triangular in cross section as clearly shown in Fig. 3. The shoe 12 has a knife edge 13 which constitutes the road engaging portion and is suitably curved as shown in Fig. 2 to engage the tread surface of the tire 10 for the major portion of its length. Any suitable material may be utilized for the construction of the shoes 12 but it is preferably desired that the same be made of metal. Each end of the shoe 12 is projected outward from the tire and provided with a transverse opening 14 for the reception of a ring 15 that constitutes a part of the means for securing the same to the tire 10.

A pair of arms 10 that are suitably curved as shown in Fig. 2 are provided with hooks 17 upon the outer ends thereof, the hooks 17 being adapted to receive the rings 15 carried by the anti-skid shoe 12, while the inner ends 18 of the arms 16 are disposed inwardly of the wheel rim 11 and formed with parallel ears 16ª provided with registering openings to receive the threaded bolt 19, an adjusting nut 20 being mounted on the threaded end of the bolt 19 and engaging the adjacent inner end 18 of the arm 16 whereby the shoe 12 is secured to the wheel.

From the above description of the device it will be readily apparent that should any one of the anti-skid shoes 12 become broken or otherwise injured, the same may be readily removed from the tire 10 by removing the nut 20 from the bolt 19 which will permit the arms 16 to be separated at their upper ends and thereafter displace their hooks 17 from the rings 15 carried by the shoes 12. A new shoe may then replace the old one and be mounted upon the tire 10 in a manner as above described.

The form of the shoe especially adapts it for co-action with the clamping arms employed. It will be noted that the triangular cross-sectional contour of the shoe presents a wide inner surface to contact with the tread surface of the tire, and the ends of the shoe project outward from the radial planes of the sides of the tire to insure a direct radial tension upon the ends of the shoe to firmly clamp its broad inner face adjacent the tire. This feature of construction in connection with the curvature of the shoe to fit the tire, provides a shoe which may be securely but detachably held in position independently, and without contact with similar shoes located adjacent thereto.

I claim:—

An anti-skidding attachment for wheel tires comprising a shoe of segment form triangular in cross-section throughout its curvilinear length and having its inner face conforming to the tread of the tire, the ends of the segment being perforated and projecting beyond the radial planes of the sides of the tire and positioned outwardly of the transverse center line of the tire, and clamping means connected with said perforated ends for clamping the segment to the wheel felly.

In testimony whereof I affix my signature in presence of two witnesses.

JOHN MARCZI.

Witnesses:
 JOHAN WJLAKI,
 RONYEO MIHALY.